United States Patent [19]

Gilding et al.

[11] Patent Number: 4,524,036

[45] Date of Patent: Jun. 18, 1985

[54] PROCESS FOR THE MANUFACTURE OF POLYURETHANE RESIN FOR ELECTROSTATIC SPINNING

[75] Inventors: Denis K. Gilding, Groton, Mass.; Roy M. Clarke, Liverpool, England

[73] Assignees: University of Liverpool, England; Vascor Inc., Calif.

[21] Appl. No.: 597,968

[22] Filed: Apr. 9, 1984

Related U.S. Application Data

[63] Continuation of Ser. No. 501,039, Jun. 6, 1983, abandoned, which is a continuation of Ser. No. 291,649, Aug. 10, 1981, abandoned.

[51] Int. Cl.$^3$ .................... B29C 6/00; B29C 23/00
[52] U.S. Cl. ............................. 264/10; 264/24; 524/233; 524/364
[58] Field of Search ............. 524/233, 364; 264/10, 264/24

[56] References Cited

U.S. PATENT DOCUMENTS

| | | | |
|---|---|---|---|
| 2,843,568 | 7/1958 | Benning et al. | 528/49 |
| 3,189,578 | 6/1965 | Kuemmerer | 528/49 |
| 3,483,167 | 12/1969 | Sommer et al. | 528/49 |
| 3,635,907 | 1/1972 | Schulze et al. | 528/49 |
| 4,043,331 | 8/1977 | Martin et al. | 428/357 |

*Primary Examiner*—Joseph L. Schofer
*Assistant Examiner*—N. Sarofim
*Attorney, Agent, or Firm*—Charles J. Metz

[57] ABSTRACT

A process for the preparation of polyurethane resins particularly suitable for electrostatic spinning which comprises forming a prepolymer of polyether glycol and a diisocyanate reacted in a molar ratio of about 1:2, and thereafter reacting the prepolymer with additional diisocyanate and a diol extender, the final molar ratio of the polyether, isocyanate and diol reactants being approximately 1:3.7:2.5. The reaction is conducted in an organic solvent at a temperature of about 45° C. to obtain a polymer having an inherent viscosity of from about 2.0 to 2.4 in a solution of 25 to 30 percent solids. The solution is diluted to about 15 percent solids prior to spinning.

21 Claims, No Drawings

PROCESS FOR THE MANUFACTURE OF POLYURETHANE RESIN FOR ELECTROSTATIC SPINNING

FIELD OF THE INVENTION

This is a continuation, of application Ser. No. 501,039, filed June 6, 1983 now abandoned, which is a continuation, of application Ser. No. 291,649, filed Aug. 10, 1981 now abandoned.

This invention relates to a process for preparing polyurethane resins, and more particularly to a process for preparing polyurethane resins which are especially suitable for spinning into fibers by the electrostatic spinning process.

BACKGROUND OF THE INVENTION

Electrostatic spinning of solutions of fiber-forming polymers is well known. Electrostatic spinning of polyurethane solutions to form fine diameter fibers is also known as described for example in U.S. Pat. Nos. 4,043,331 and 4,044,404.

The process of electrostatic spinning of polyurethanes and other fiber-forming polymers involves the introduction of a solution of the polymer into an electrostatic field where droplets of the solution are attenuated into fibers while being drawn to an electrode where the fibers are collected. The spinning environment is controlled to evaporate the solvent while the fibers are being formed in the electrostatic field so that the fibers collected on the electrode retain their individual identity. Some fusing between fibers at points of intersection may occur, and is often desirable, as a result of residual solvent content in the fibers. Eventually, residual solvent is removed from the mat of collected fibers as part of the total spinning process.

The fibers obtained by the electrostatic spinning process are thin, generally in the order of 0.1 to 25 microns, and preferably 0.5 to 10 microns. Fibers having different characteristics are obtained by adjusting the spinning conditions including the molecular weight and concentration of polymer in the spinning solution. In all cases however, it is essential that the spinning solution be a composition which is capable of being attenuated in the electrostatic field. Some problems have been experienced in producing fibers of uniform diameter from certain polymer solutions, including solutions of polyurethanes.

It is accordingly an object of the present invention to provide a polyurethane polymer which is particularly suitable for use in the electrostatic spinning of fine fibers. It is a further object of this invention to provide a process for the preparation of the aforesaid polyurethane polymers. These and other objects of the present invention will be apparent from the ensuing description and claims.

SUMMARY OF THE INVENTION

Polyurethane polymers are prepared by solution polymerization in a two stage process wherein polytetramethylene glycol is first reacted with diphenylmethane diisocyanate (MDI) in molar proportions of about 1:2 and in an organic solvent to form a prepolymer. The prepolymer is subsequently extended by reaction with butane diol and additional MDI in a molar porportions of about 2.5 and 1.6 (based on glycol) respectively. Polymerization is continued with incremental additions of organic solvent until a 25 to 30% by weight a solution of polymer having an inherent viscosity of from about 2.0 to 2.4 is obtained, at which point the reaction is terminated by the addition of a small amount of methanol.

The resulting polyurethane polymer solution is diluted to about 15% solids with a volatile organic solvent and readily spun into fine fibers of a uniform diameter by the electrostatic spinning process. The resulting porous fibrous mat in the form of a sheet or tube has many desirable properties including uniformity of fibers and pore size.

DESCRIPTION OF PREFERRED EMBODIMENTS

The process of the present invention is illustrated by the following example:

150 g (0.075 m) polytetramethylene glycol (PMEG) (molecular weight 2000) is charged molten to a reaction vessel equipped with a heater, stirrer and thermometer. The molten PMEG is stirred vigorously under 150 mm Hg vacuum at 100°–150° C. for 1½ hours to remove moisture and then allowed to cool under a dry nitrogen atmosphere to 60° C.

39 g (0.156 m) of flake diphenyl methane diisocyanate (MDI) is added quickly to the reaction vessel followed by 60 g freshly distilled dimethyl formamide (DMF). The mixture is stirred continuously at 45° C.±2° for approximately 2 hours under an atmosphere of dry nitrogen to form a prepolymer.

30.61 g (0.122 m) MDI, 16.88 g (0.1875 m) of dry butane diol (BD) and 180 g DMF are quickly added to the prepolymer with stirring, taking precautions to exclude moisture. The reaction is continued under a dry nitrogen atmosphere at 45° C.±2° with continuous stirring.

As the viscosity of the solution increases to 400–500 poise, 115 g of additional DMF are added. This procedure is repeated three times to give a final polymer solution of 28.8% solids. After the final addition of DMF, the reaction is continued until a viscosity of 600 poise at 45° C. is attained, at which time the reaction is terminated by the addition of 2 ml methanol. The inherent viscosity of the polymer is determined to be 2.16 in HFIP at 0.1 g/dl concentration. The complete process takes approximately 12 hours.

To prepare the polymer for electrostatic spinning, the 28.8% solids polymer solution is diluted with methyl ethyl ketone to obtain a final spinning solution of approximately 15 percent solids by weight.

In the process of the present invention, the preferred molar proportion of PMEG to MDI in the first stage reaction for the preparation of the prepolymer is 1:2. In accordance with the present invention, it is essential that the molar excess of MDI in this reaction not exceed 5 percent, and the preferred limits are from about 90% up to 105% with an optimum range of from about 96% to 100%. In the preceeding example, the molar proportion of MDI was 2.08, providing a 4% excess of the preferred molar amount. By thus limiting the amount of free MDI during the preparation of the prepolymer, and by carrying out the reaction at the relatively low temperature of 45° C., it is believed that the possibility of cross-linking in the prepolymer is substantially reduced, and that this results in the improved electrostatic spinning performance observed with the polymers of the present invention.

The final molar proportions of the PMEG:MDI:BD reactants used in the process of the present invention are preferably about 1:3.7:2.5. Minor variations in these proportions in the order of plus or minus 5 percent are permissible without departing from the essence of the present invention.

The polyether glycol used in the present invention is preferably PMEG having a molecular weight in the range of 1500-2500, and most preferably about 2000, although higher and lower molecular weight compositions can be used. Other polyether glycols known to be useful in the preparation of fiber-forming polyurethanes which may also be used in the present invention include polyethylene ether glycol, polypropylene ether glycol, 1,2-polydimethylene ether glycol, and polydecamethylene ether glycol.

The diisocyanates useful in the present invention are also those known to be useful in the preparation of fiber-forming polyurethanes. The most common compound is MDI as used in the preceeding example, but other organic diisocyanates may also be used with good results, including the aromatic, aliphatic and cycloaliphatic diisocyantes. Representative compounds include 2,4-tolylene diisocyanate, m-phenylene diisocyanate, 4-chloro-1,3-phenylene diisocyanate, 4,4'-biphenylene diisocyanate, 1,5-naphthylene diisocyanate, 1,4-tetramethylene diisocyanate, 1,6-hexamethylene diisocyanate, 1,10-decamethylene diisocyanate, 1,4-cyclohexylene diisocyanate, 4,4'-methylene-bis-(cyclohexyl isocyanate) and 1,5-tetrahydronaphthylene diisocyanate. Arylene diisocyanates, i.e., those in which each of the two isocyanate groups is attached directly to an aromatic ring, are preferred.

The diol extenders used in the present invention in the molar proportions as set forth above are also the common diol extenders used in the polyurethane art. Although the most common compound is 1,4-butane diol as used in the preceeding example, any of the other known diol extenders may also be used with good results.

The first stage reaction of the polyether glycol and diisocyanate is conducted in solution of about 75% solids by weight. The second stage reaction for the preparation of the polyurethane resin is initiated with additional solvent to reduce the solids level to about 50% by weight. As the second stage reaction proceeds, increases in viscosity are monitored by the relative decrease in stirrer speed or increase in power requirements, and additional solvent is added in increments maintain the viscosity at less than about 400-500 poise until the solids level is decreased to 25 to 30 percent by weight. The reaction is then allowed to proceed with viscosity monitored by sampling the reaction vessel until the polymer attains an inherent viscosity of from about 2.0 to 2.4, and most preferably of about 2.2.

The organic solvent used in the polymerization process is preferably DMF although other volatile organic solvents such as dimethyacetamide (DMAc) or methyl ethyl ketone (MEK) are also suitable. The use of MEK as a diluent in the final spinning solution is desirable to increase the volatility of the solvent and assure its rapid evaporation during formation of the fibers. Spinning conditions, particularly temperature and air flow, may have to be increased to promote evaporation of the solvent where higher boiling solvents such as DMAc are used. For details on electrostatic spinning procedures, reference is made to U.S. Pat. No. 4,043,331, particularly Example 5 thereof which deals with spinning a solution of a commercial polyurethane polymer.

What we claim is:

1. In a process of electrostatic spinning of urethane polymers to form fine diameter fibers wherein a solution of a urethane polymer is introduced into an electrostatic field in the form of droplets which are attenauated into fibers while being drawn to an electrode where the fibers are collected, the improvement which comprises using as the said urethane polymer a polyurethane resin produced by a process which comprises the steps of:
    a. reacting in a volatile organic solvent a polyalkylene ether glycol and an organic diisocyanate in a molar ratio of about 1:2 to form a prepolymer;
    b. reacting said prepolymer with additional organic diisocyanate and an alkanediol extender in a volatile organic solvent to form a polyurethane resin, the final molar ratios of the polyalkylene ether glycol, organic diisocyanate, and alkanediol being about 1:3.7:2.5;
    c. continuing said reaction with incremental additions of volatile organic solvent until a 25 to 30 percent by weight solids solution of said polyurethane resin having an inherent viscosity of from about 2.0 to 2.4 is obtained; and
    d. terminating said reaction by the addition of an alcohol.

2. A process of claim 1 wherein said reactions are conducted at 45° C.±2°.

3. A process of claim 1 wherein said polyalkylene ether glycol is polytetramethylene ether glycol.

4. A process of claim 1 wherein said organic diisocyanate is diphenylmethane diisocyanate.

5. A process of claim 1 wherein said alkanediol extender is 1,4-butane diol.

6. A process of claim 1 wherein said volatile organic solvent is dimethylformamide.

7. The process of claim 1 wherein said organic diisocyanate is present in an amount of from about 90% to not more than 105% of said molar ratio of 1:2 during formation of the prepolymer.

8. The process of claim 1 wherein said reaction of polyalkylene ether glycol and organic diisocyanate is conducted in a solution of about 75 weight percent solids.

9. The process of claim 1 wherein said reaction of said prepolymer is initially in a solution of about 50 weight percent solids.

10. The process of claim wherein the incremental addition of solvent during the continuation of the reaction is effective to maintain the viscosity of the solution below about 500 poise until the solids level is reduced to 25 to 30 percent by weight and the reaction is allowed to go to the termination point.

11. In a process of electrostatic spinning of urethane polymers to form fine diameter fibers wherein a solution of a urethane polymer is introduced into an electrostatic field in the form of droplets which are attenuated into fibers while being drawn to an electrode where the fibers are collected, the improvement which comprises using as the said urethane polymer a polyurethane resin produced by a process which comprises the steps of:
    a. reacting in a first volatile organic solvent a polyalkylene ether glycol and an organic diisocyanate in a molar ratio of about 1:2 to form a prepolymer;
    b. reacting said prepolymer with additional organic diisocyanate and an alkanediol extender in said first volatile organic solvent to form a polyurethane resin, the final molar ratios of the polyalkylene ether glycol, organic diisocyanate, and alkanediol being about 1:3.7:2.5;

c. continuing said reaction with incremental additions of said first volatile organic solvent until a 25 to 30 percent by weight solids solution of said polyurethane resin having an inherent viscosity of from about 2.0 to 2.4 is obtained;

d. terminating said reaction by the addition of an alcohol; and e. diluting said polyurethane resin solution to about 15 percent by weight solids with a second volatile organic solvent.

12. A process of claim 11 wherein said reactions are conducted at 45°±2°.

13. A process of claim 11 wherein said polyalkylene ether glycol is polytetramethylene ether glycol.

14. A process of claim 11 wherein said organic diisocyanate is diphenylmethane diisocyanate.

15. A process of claim 11 wherein said alkanediol extender is 1,4-butane diol.

16. A process of claim 11 wherein said first and second volatile organic solvents are dimethylformamide.

17. A process of claim 11 wherein said first volatile organic solvent is dimethyl formamide and second volatile organic solvent is methyl ethyl ketone.

18. The process of claim 11 wherein said organic diisocyanate is present in an amount of from about 90% to not more than 105% of said molar ratio of 1:2 during formation of the prepolymer.

19. The process of claim 11 wherein said reaction of polyalkylene ether glycol and organic diisocyanate is conducted in a solution of about 75 weight percent solids.

20. The process of claim 11 wherein said reaction of said prepolymer is initially in a solution of about 50 weight percent solids.

21. The process of claim 20 wherein the incremental addition of solvent during the continuation of the reaction is effective to maintain the viscosity of the solution below about 500 poise until the solids level is reduced to 25 to 30 percent by weight and the reaction is allowed to go to the termination point.

* * * * *